No. 616,253.  
H. PETERS.  
WAGON.  
(Application filed July 16, 1898.)  
Patented Dec. 20, 1898.

(No Model.)

Witnesses:  
Lee J. Van Horn  
Charles B. Mann Jr.

Inventor:—  
Henry Peters  
By Chas. B. Mann  
Attorney.

UNITED STATES PATENT OFFICE.

HENRY PETERS, OF BALTIMORE, MARYLAND.

WAGON.

SPECIFICATION forming part of Letters Patent No. 616,253, dated December 20, 1898.

Application filed July 16, 1898. Serial No. 686,097. (No model.)

*To all whom it may concern:*

Be it known that I, HENRY PETERS, a citizen of the United States, residing at Baltimore, in the State of Maryland, have invented certain new and useful Improvements in Wagons, of which the following is a specification.

This invention relates to improvements in the coupling parts and means of attaching poles and shafts to wagons. One object of the invention is to provide a pole or shaft attaching frame and a stay therefor, which also supplements the ordinary "fifth-wheel."

The invention is illustrated in the accompanying drawings, in which—

Figure 1:
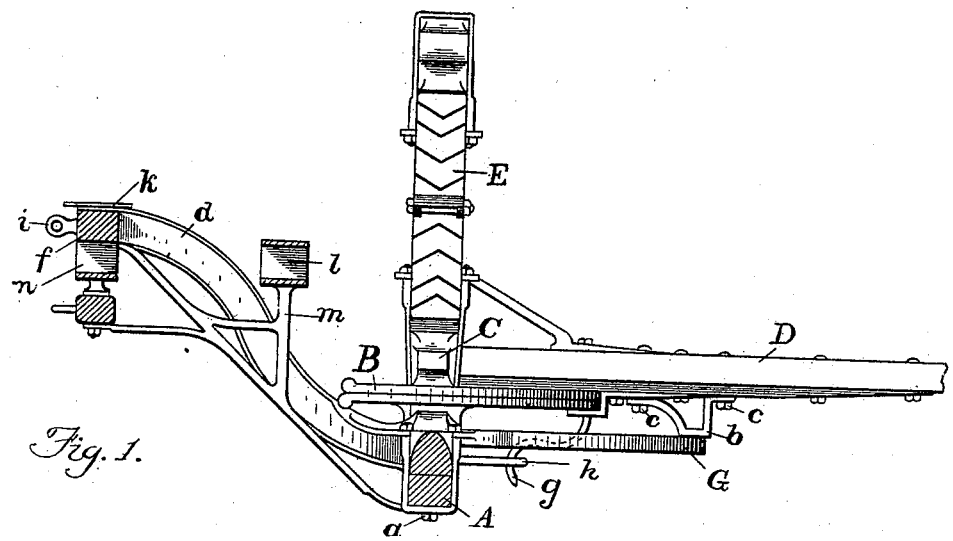
Figure 2:
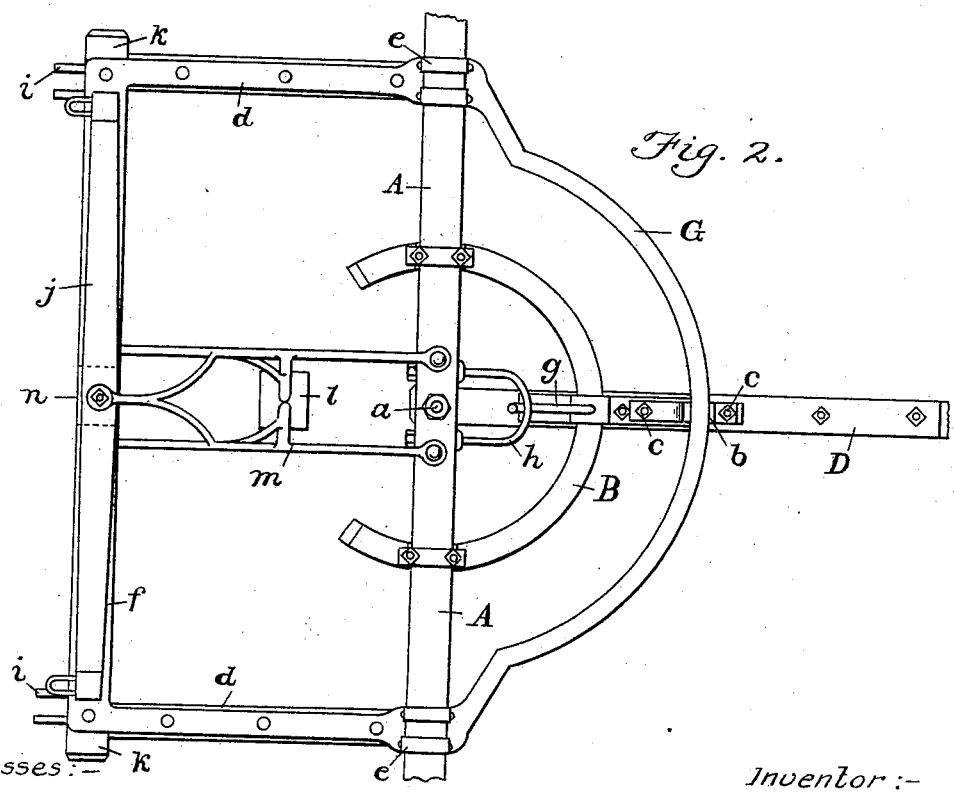

Figure 1 is a side elevation, partly in section, showing the pole or shaft attaching frame, axle, fifth-wheel, and my improved stay. Fig. 2 is an inverted or bottom plan view of the same parts.

The letter A designates the front axle, the arms of which are broken off; B, the ordinary fifth-wheel; C, the head-block; D, the perch or reach, and E a front spring.

A king-bolt $a$ and an ordinary perch or reach pole D are employed as usual. Back of the fifth-wheel the perch is provided with a pendent or down-projecting slide-seat $b$, secured by bolts $c$. In front of the axle A is a pole or shaft attaching frame having two upward-curved side bars $d$, rigidly attached to the axle by clips $e$ and at their front ends united by a cross-bar $f$. This frame has a rigidly-attached iron stay-bar G, which is semicircular and extends back from the axle and takes below the perch or reach D and bears up against the said down-projecting slide-seat $b$. This semicircular stay-bar is concentric with the king-bolt $a$ and supports the frame in front of the axle and also supplements the ordinary fifth-wheel B. When the front axle turns on its pivot—the king-bolt—the semicircular bar G slides around under the pendent seat $b$ and gives stability to all parts of the coupling. At each end of the frame is a plate $k$, which serves as a step to get in and out of the wagon. Shaft-couplings $i$ are attached to the cross-bar $f$ of the frame, and a singletree $j$ is pivoted to said cross-bar.

It will be seen that the shafts used in this construction will be much shorter than ordinary shafts in consequence of the attaching-frame, and such shafts will therefore be much lighter, and consequently the weight on the horse's back will be much less. A person getting in and out of the wagon does not step on the shafts, but on the plate $k$, supported on the frame. The person's weight therefore does not bear on the horse, which avoids producing sore backs.

A pole-socket is also attached to the frame. This comprises a box $n$, fixed centrally on the cross-bar $f$, and a rear socket $l$, supported on irons $m$, which are secured to the axle and to the said cross-bar.

A safety-hook $g$ is fixed on the lower side of the reach D and projects forward toward the king-bolt, and its hook part takes into a backward-projecting loop $h$, which is rigidly attached to the front axle. Normally this hook $g$ does not contact with the loop $h$, but is in position to engage it should the king-bolt $a$ break or the axle disconnect in any way. Thus the hook $g$ and loop will serve as a safety device in the emergency noted.

Having thus described my invention, what I claim is—

1. The combination of the front axle; head-block; ordinary fifth-wheel; a perch or reach provided with a down-projecting slide-seat; and a frame at the front of the axle and rigidly attached thereto and having a semicircular stay-bar, D, extending back of the axle and taking below the said down-projecting slide-seat.

2. The combination of the front axle; head-block; a perch or reach bar attached to the head-block; a frame at the front of the axle and having side-bars, $d$, rigidly attached to the axle and a cross-bar uniting the side-bars; a semicircular stay-bar united to the said front frame and extending back of the axle and below the reach-bar; a pole-box, $n$, fixed centrally on said cross-bar; irons secured to the axle and also to the center of said cross-bar; and a pole-socket, $l$, secured on said irons.

3. The combination of a front axle; a perch or reach; fifth-wheel; a pole or shaft attaching frame rigidly secured to the front axle and projecting forward thereof and unconnected with said fifth-wheel; and a stay-bar attached to the front axle and extending back and below the perch or reach.

4. The combination of the front axle; head-block; ordinary fifth-wheel; a loop, $h$, attached to the front axle and projecting rearward thereof; and a hook, $g$, fixed to the lower side of the reach-bar and projecting forward and taking into said loop.

In testimony whereof I affix my signature in the presence of two witnesses.

HENRY PETERS.

Witnesses:
CHARLES B. MANN, Jr.,
CHAPIN A. FERGUSON.